US011767768B2

(12) United States Patent
Poick

(10) Patent No.: US 11,767,768 B2
(45) Date of Patent: Sep. 26, 2023

(54) UNISON MEMBER FOR VARIABLE GUIDE VANE

(71) Applicant: PRATT & WHITNEY CANADA CORP., Longueuil (CA)

(72) Inventor: Daniel Poick, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/175,413

(22) Filed: Feb. 12, 2021

(65) Prior Publication Data

US 2022/0162959 A1    May 26, 2022

Related U.S. Application Data

(63) Continuation of application No. 17/105,558, filed on Nov. 26, 2020, now Pat. No. 11,578,611.

(51) Int. Cl.
*F01D 17/16* (2006.01)
*F01D 25/24* (2006.01)
(Continued)

(52) U.S. Cl.
CPC ......... *F01D 17/165* (2013.01); *F01D 25/243* (2013.01); *F05D 2240/12* (2013.01); *F05D 2240/14* (2013.01); *F05D 2300/603* (2013.01)

(58) Field of Classification Search
CPC ...... F01D 17/165; F01D 17/16; F01D 17/162; F01D 25/246; F01D 25/24; F01D 7/00; F01D 9/04; F01D 9/042; F01D 25/243; F05D 2240/12; F05D 2240/14; F05D 2260/50; F05D 2250/90; F05D 2260/30;
(Continued)

(56) References Cited

U.S. PATENT DOCUMENTS 7,300,245 B2 *  11/2007  Bouru ................... F01D 17/162
                                                            415/147
9,353,644 B2 *   5/2016  LeBlanc ............... F01D 17/162
                        (Continued)

FOREIGN PATENT DOCUMENTS

EP          3241997 A1    11/2017
EP          3628828 A1     4/2020
                        (Continued)

OTHER PUBLICATIONS

European Search Report issued in counterpart application 22156416.4 dated Jul. 4, 2022.

*Primary Examiner* — Eric J Zamora Alvarez
(74) *Attorney, Agent, or Firm* — NORTON ROSE FULBRIGHT CANADA LLP.

(57) ABSTRACT

A variable guide vane (VGV) assembly for a gas turbine engine, has: variable guide vanes circumferentially distributed about a central axis, the variable guide vanes rotatable about respective spanwise axes; and a unison member rollingly engageable to a casing of the gas turbine engine for rotation about the central axis, the unison member operatively connected to the variable guide vanes for rotating the variable guide vanes about the respective spanwise axes, the unison member having: a first ring extending around the central axis, a second ring spaced apart from the first ring and extending around the central axis, and connecting members connecting the first ring to the second ring.

19 Claims, 6 Drawing Sheets

(51) Int. Cl.
*F04D 29/56* (2006.01)
*F04D 29/64* (2006.01)

(58) Field of Classification Search
CPC ............ F05D 2260/79; F05D 2230/64; F05D 2300/603; F04D 29/563; F04D 27/0246; F04D 29/059; F04D 29/644; F04D 27/002; F04D 29/023; F05B 2260/50; F05B 2270/60
See application file for complete search history.

(56) References Cited

U.S. PATENT DOCUMENTS

| | | | |
|---|---|---|---|
| 10,598,039 B2* | 3/2020 | Bordoni | F01D 17/162 |
| 2020/0141265 A1* | 5/2020 | Karapurath | F04D 29/563 |

FOREIGN PATENT DOCUMENTS

| | | | |
|---|---|---|---|
| EP | 4006314 A1 | 6/2022 | |
| EP | 4008884 A1 | 6/2022 | |

* cited by examiner

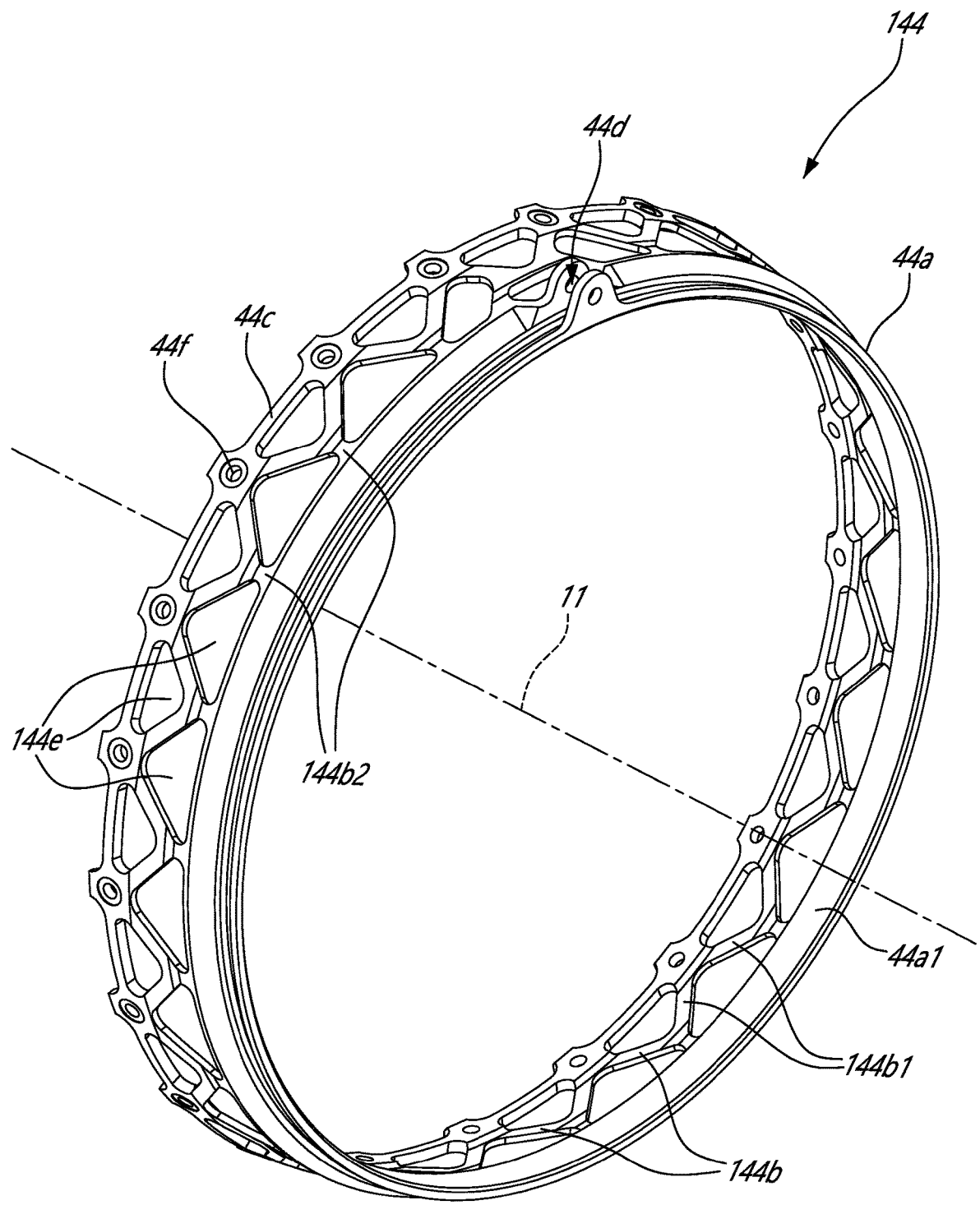

UNISON MEMBER FOR VARIABLE GUIDE VANE

CROSS-REFERENCE TO RELATED APPLICATIONS

This application is a continuation of U.S. patent application Ser. No. 17/105,558 filed on Nov. 26, 2020, the entire contents of which are incorporated by reference herein.

TECHNICAL FIELD

The disclosure relates generally to gas turbine engines, and more particularly to variable guide vanes assemblies as may be present in a compressor section and/or a turbine section of a gas turbine engine.

BACKGROUND OF THE ART

In a gas turbine engine, air is pressurized by rotating blades within a compressor, mixed with fuel and then ignited within a combustor for generating hot combustion gases, which flow downstream through a turbine for extracting energy therefrom. Within the compressor of the engine, the air is channelled through circumferential rows of vanes and blades that pressurize the air in stages. Variable guide vanes (VGVs) are sometimes used within compressors and/or turbines, and provide vanes which are rotatable such that the angle of attack they define with the incoming flow may be varied. Improvements with such variable guide vane assemblies is sought.

SUMMARY

In one aspect, there is provided a variable guide vane (VGV) assembly for a gas turbine engine, comprising: variable guide vanes circumferentially distributed about a central axis, the variable guide vanes rotatable about respective spanwise axes; and a unison member rollingly engageable to a casing of the gas turbine engine for rotation about the central axis, the unison member operatively connected to the variable guide vanes for rotating the variable guide vanes about the respective spanwise axes, the unison member having: a first ring extending around the central axis, a second ring spaced apart from the first ring and extending around the central axis, and connecting members connecting the first ring to the second ring.

In some embodiments, the first ring, the second ring, and the connecting members are parts of a single monolithic body of the unison member.

In some embodiments, the unison member defines pockets circumferentially interspaced with the connecting members.

In some embodiments, the unison member is free of material at the pockets.

In some embodiments, the first ring is axially offset from the second ring relative to the central axis.

In some embodiments, the connecting members are parallel to one another.

In some embodiments, the connecting members includes pairs of connecting members, for a pair of the pairs of the connecting members, a first stiffener of the pair extending from the first ring toward the second ring, a second stiffener of the pair extending from the first ring toward the second ring, the first stiffener extending toward the second stiffener from the first ring toward the second ring.

In some embodiments, a thickness of the connecting members taken in a radial direction relative to the central axis is less than that of the first and second rings.

In some embodiments, an axial distance from the first ring to the second ring relative to the central axis is more than a radial distance from the first ring to the second ring.

In another aspect, there is provided a gas turbine engine, comprising: an annular gaspath extending around a central axis, the annular gaspath defined between a first casing and a second casing; and a variable guide vane (VGV) assembly having variable guide vanes circumferentially distributed about the central axis, the variable guide vanes rotatable about respective spanwise axes, and a unison member rollingly engaged to the first casing and rotatable about the central axis, the unison member operatively connected to the variable guide vanes for rotating the variable guide vanes about the respective spanwise axes, the unison member defining a plurality of pockets circumferentially distributed about the central axis, the pockets located between a first ring and a second ring of the unison member.

In some embodiments, the first ring and the second ring are parts of a monolithic body of the unison member.

In some embodiments, the unison member is free of material at the pockets.

In some embodiments, the pockets are rectangular.

In some embodiments, the pockets are triangular.

In some embodiments, the first ring is axially offset from the second ring relative to the central axis.

In some embodiments, the second ring defines apertures circumferentially distributed about the central axis, the apertures receiving pins, the unison member operatively connected to the variable guide vanes via the pins slidably received within slots of vane arms secured to the variable guide vanes.

In some embodiments, each of the apertures is located at an intersection of the second ring and a respective one of connecting members, the connecting members connecting the first ring to the second ring and interspaced with the pockets.

In some embodiments, the first ring is received within a groove defined by a bushing supported by the first casing, the first ring rollingly engaging the first casing via the bushing.

In some embodiments, an axial distance from the first ring to the second ring relative to the central axis is more than a radial distance from the first ring to the second ring.

In some embodiments, the unison member defines an attachment point for an actuator, the attachment point protruding from the first ring.

DESCRIPTION OF THE DRAWINGS

Reference is now made to the accompanying figures in which:

FIG. 7 is a three dimensional view of a unison member for the variable guide vane assembly of FIG. 3 in accordance with another embodiment.

DETAILED DESCRIPTION

The following disclosure relates generally to gas turbine engines, and more particularly to assemblies including one or more struts and variable orientation guide vanes as may be present in a compressor section and/or a turbine section of a gas turbine engine. In some embodiments, the assemblies and methods disclosed herein promote better performance of gas turbine engines, such as by improving flow conditions in the compressor section and/or turbine section in some operating conditions, improving the operable range of the compressor/turbine, reducing energy losses and aerodynamic loading on rotors.

Figure 1:
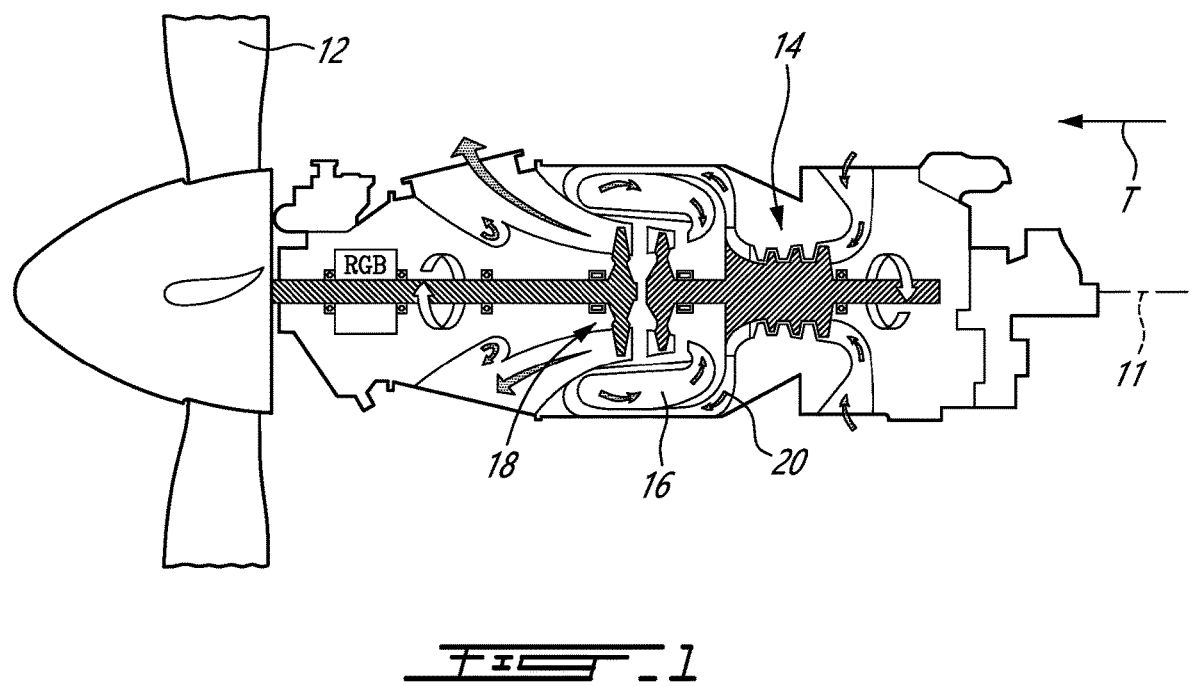
FIG. 1 is a schematic cross sectional view of a gas turbine engine.

FIG. 1 illustrates a gas turbine engine 10 of a type preferably provided for use in subsonic flight, and in driving engagement with a rotatable load, which is depicted as a propeller 12. The gas turbine engine has in serial flow communication a compressor section 14 for pressurizing the air, a combustor 16 in which the compressed air is mixed with fuel and ignited for generating an annular stream of hot combustion gases, and a turbine section 18 for extracting energy from the combustion gases.

It should be noted that the terms "upstream" and "downstream" used herein refer to the direction of an air/gas flow passing through an annular gaspath 20 of the gas turbine engine 10. It should also be noted that the term "axial", "radial", "angular" and "circumferential" are used with respect to a central axis 11 of the gaspath 20, which may also be a central axis of gas turbine engine 10. The gas turbine engine 10 is depicted as a reverse-flow engine in which the air flows in the annular gaspath 20 from a rear of the engine 10 to a front of the engine 10 relative to a direction of travel T of the engine 10. This is opposite than a through-flow engine in which the air flows within the gaspath 20 in a direction opposite the direction of travel T, from the front of the engine towards the rear of the engine 10. The principles of the present disclosure may apply to reverse-flow and through-flow engines and to any other gas turbine engines, such as a turbofan engine and a turboprop engine.

Figure 2:
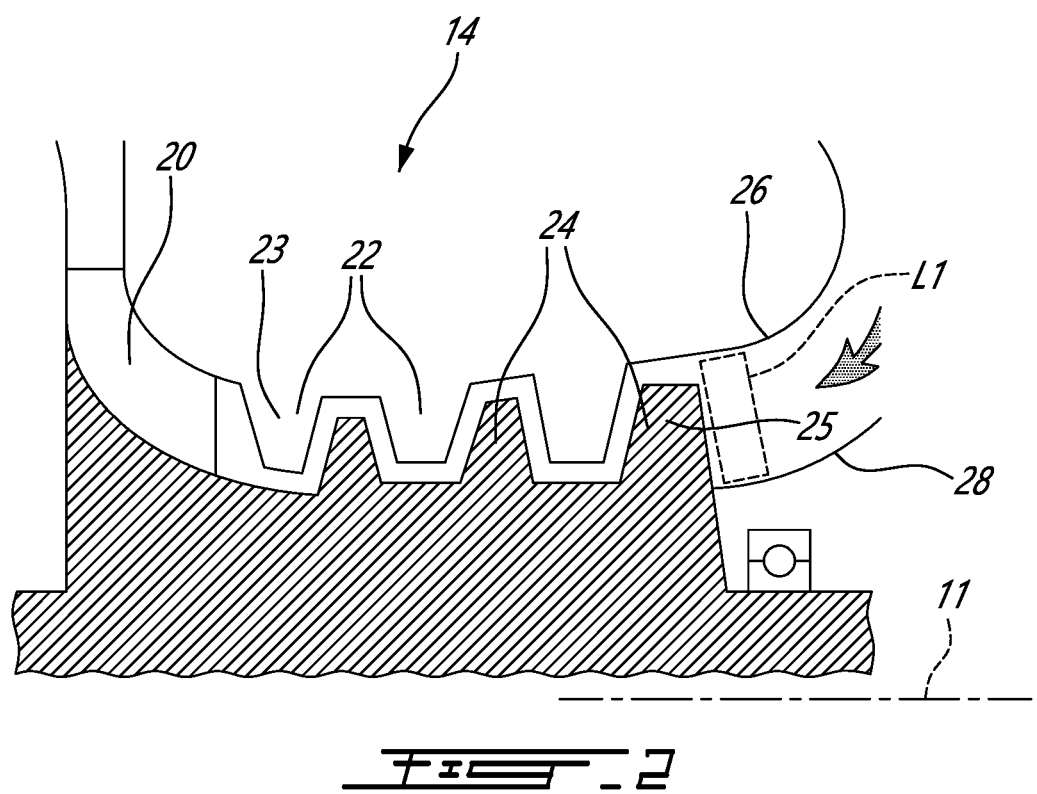
FIG. 2 is an enlarged view of a portion of FIG. 1.

Referring now to FIG. 2, an enlarged view of a portion of the compressor section 14 is shown. The compressor section 14 includes a plurality of stages, namely three in the embodiment shown although more or less than three stages is contemplated, each stage including a stator 22 and a rotor 24. The rotors 24 are rotatable relative to the stators 22 about the central axis 11. Each of the stators 22 includes a plurality of vanes 23 circumferentially distributed about the central axis 11 and extending into the gaspath 20. Each of the rotors 24 also includes a plurality of blades 25 circumferentially distributed around the central axis 11 and extending into the gaspath 20, the rotors 24 and thus the blades 25 thereof rotating about the central axis 11. As will be seen in further detail below, at least one of the stators 22 includes vanes 23, which are variable guide vanes (VGVs) and thus includes a variable guide vane assembly 40 as will be described.

In the depicted embodiment, the gaspath 20 is defined radially between an outer casing or wall 26 and an inner casing or wall 28. The vanes 23 and the blades 25 extend radially relative to the central axis 11 between the outer and inner casings 26, 28. "Extending radially" as used herein does not necessarily imply extending perfectly radially along a ray perfectly perpendicular to the central axis 11, but is intended to encompass a direction of extension that has a radial component relative to the central axis 11. The vanes 23 can be fixed orientation or variable orientation guide vanes (referred hereinafter as VGVs). Examples of rotors include fans, compressor rotors (e.g. impellers), and turbine rotors (e.g. those downstream of the combustion chamber).

Figure 3:
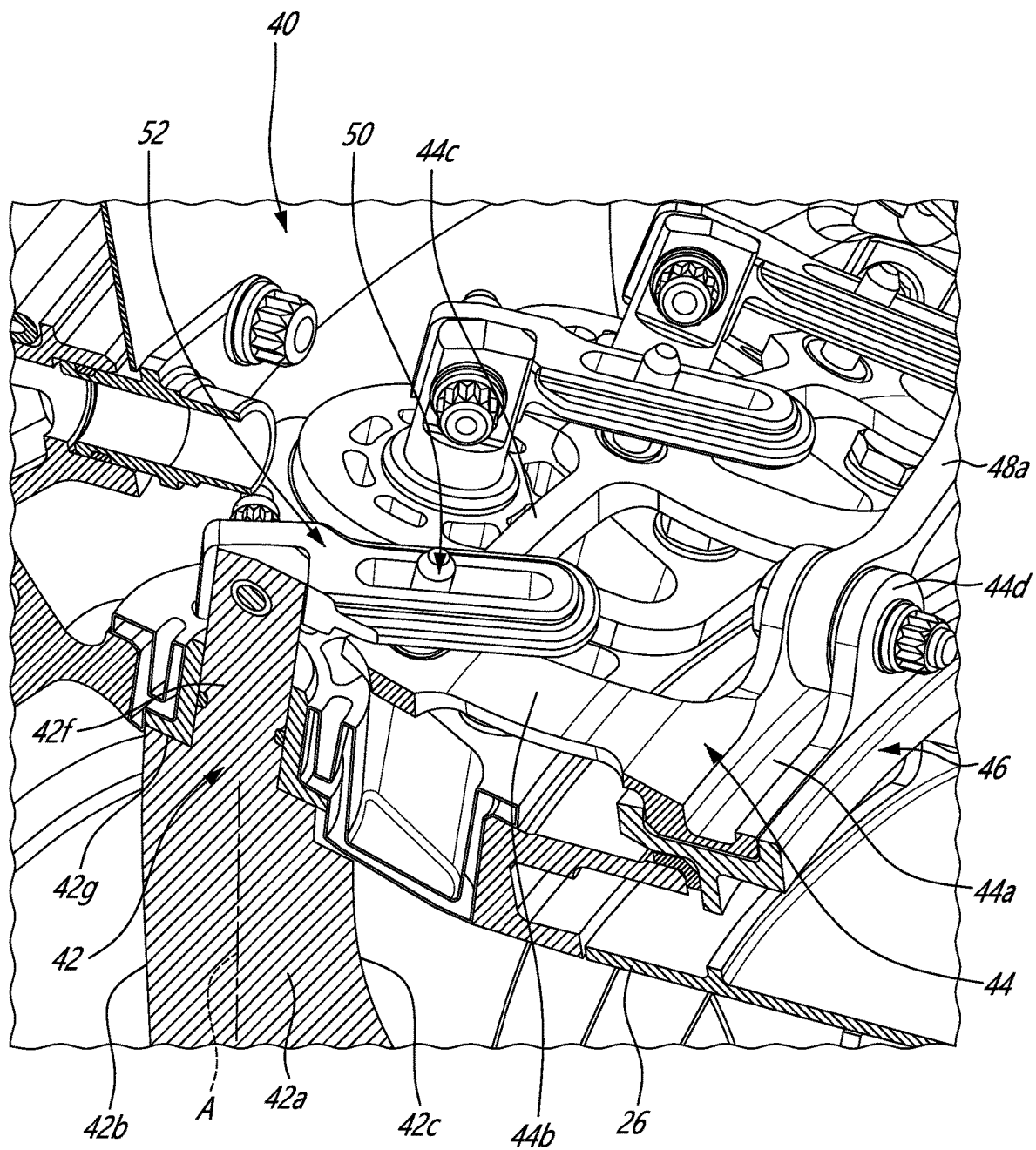
FIG. 3 is a three dimensional cutaway view of a portion of a variable guide vane assembly to be used with the engine of FIG. 1.

Referring to FIG. 3, an example of a variable guide vane (VGV) assembly of a stator 22 of the engine 10 is shown at 40. Any of the stators 22 of the compressor section 14 depicted in FIG. 2 may be embodied as a variable guide vane 40. It will be appreciated that, in some cases, the VGV assembly 40 may be used as a stator of the turbine section 18 of the engine 10 without departing from the scope of the present disclosure. The VGV assembly 40 may be located at an upstream most location L1 (FIG. 2) of the compressor section 14. That is, the VGV assembly 40 may be a variable inlet guide vane assembly.

The VGV assembly 40 includes a plurality of vanes 42, only one being illustrated in FIG. 3, circumferentially distributed about the central axis 11 and extending radially between the inner casing 28 (FIG. 2) and the outer casing 26. In the present embodiment, the vanes 42 are rotatably supported at both of their ends by the inner and outer casings 28, 26. Particularly, each of the vanes 42 has an airfoil 42*a* having a leading edge 42*b* and a trailing edge 42*c* both extending along a span of the airfoil 42*a*. Each of the vanes 42 has an inner stem (not shown), also referred to as an inner shaft portion, at an inner end of the airfoil 42*a* and an outer stem, also referred to as an outer shaft portion, 42*f*, at an outer end 42*g* of the airfoil 42*a*. The inner and outer stems may be rollingly engaged to the inner and outer casings, 28, 26, respectively. As shown in FIG. 3, the outer stems 42*f* are rollingly engaged within apertures defined through the outer casing 26. The vanes 42 are rotatable about respective spanwise axes A to change an angle of attack defined between the vanes 42 and a flow flowing within the annular gaspath 20. In the embodiment shown, the spanwise axes A extend between the inner and outer stems of the vanes 42

Figure 4:
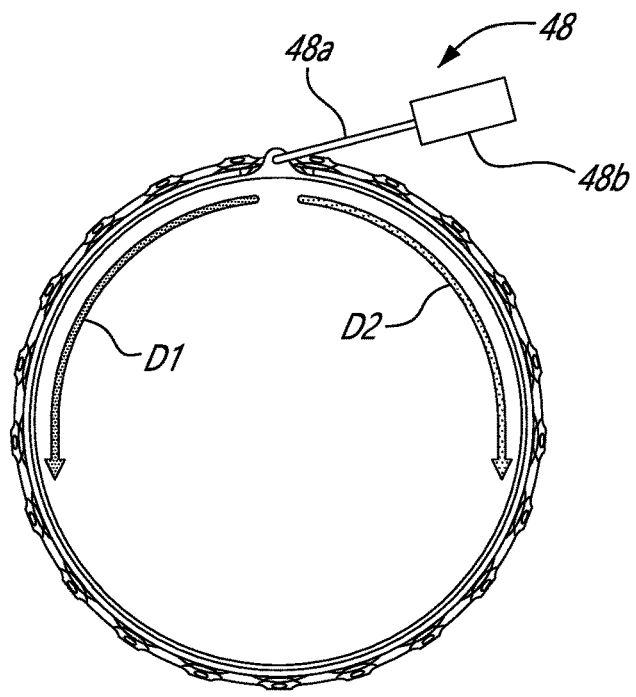
FIG. 4 is a front view of a unison member in accordance with one embodiment for the variable guide vane assembly of FIG. 3.

Referring to FIGS. 3-4, the VGV assembly 40 includes a unison member 44, also referred to as a drive ring, which extends annularly all around the central axis 11. The unison member 44 is used to convert a linear motion input into a rotational motion output. The unison member 44 is used to synchronize the motion of the variable guide vanes 42 about their respective spanwise axes A. The unison member 44 is rollingly engaged to the outer casing 26. Particularly, in the embodiment shown, the unison member 44 is rollingly engaged to the outer casing 26 via a bushing 46. In the present embodiment, the bushing 46 is secured to the outer casing 26, the unison member 44 slides on the bushing 46 when the unison member 44 rotates about the central axis 11. The bushing 46 constrains the unison member 44 axially and radially relative to the central axis 11 such that the unison member 44 moves solely circumferentially relative to the central axis 11. Any suitable bushing may be used. For instance, the bushing may be secured to the unison member 44 and both of the bushing and the unison member 44 may rotate relative to the outer casing 26.

As illustrated in FIG. 3, the VGV assembly 40 includes sliders, also referred to as driving pins, 50 that are secured to the unison member 44. The sliders 50 may be secured to the unison member 44 by being monolithic with the unison member 44. In the present case, the sliders 50 are separate components secured (e.g., threaded, welded, etc) to the unison member 44.

The VGV assembly 40 includes vane arms 52. Each of the vane arms 52 is secured to a respective one of the outer stems 42f of the vanes 42 and extends substantially transversally away from the outer stems 42f. That is, each of the vane arms 52 extends in directions having a radial component relative to its spanwise axis A of the vanes 42. The vane arms 52 are engageable by the sliders 50 to rotate the vanes 42 about their respective spanwise axes A. That is, rotation of the unison member 44 about the central axis 11 moves the sliders 50 circumferentially relative to the central axis 11. This causes the sliders 50 to slide within the slots of the vane arms 52 thereby pivoting the vane arms 52 and the vanes 42 secured thereto about the respective spanwise axes A of the vanes 42 for changing the angle of attacks defined between the vanes 42 and the flow flowing within the annular gaspath 20.

Figure 5:
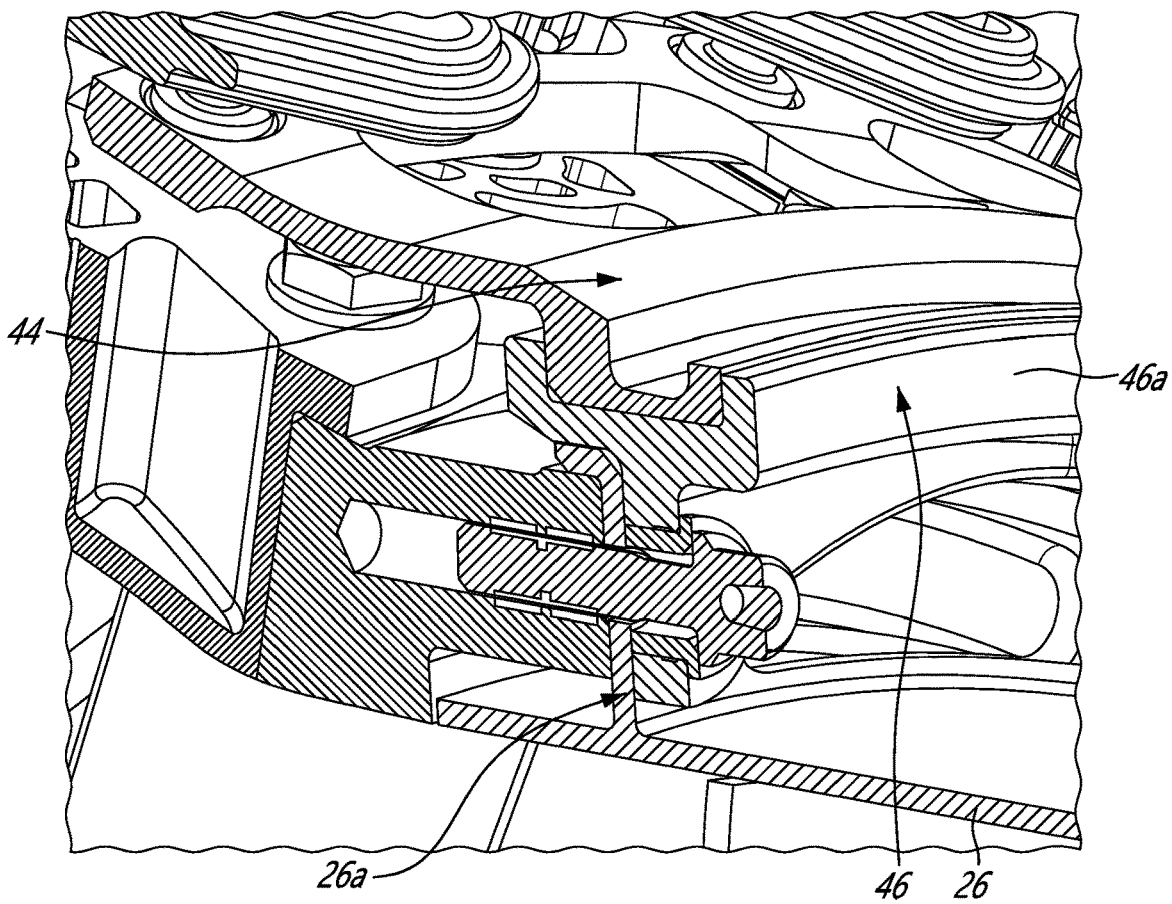
FIG. 5 is a three dimensional cutaway view of the variable guide vane assembly of FIG. 3 viewed at a different angle illustrating a bushing in accordance with one embodiment for supporting the unison member of FIG. 4.

Referring now to FIG. 5, the bushing 46 is used as an interface between the outer casing 26 and the unison member 44. The bushing 46 is rollingly engaged by the unison member 44 to allow rotation of the unison member 44 about the central axis 11. The unison member 44 is free to rotate about the central axis 11 of the engine 10 in a circumferential direction relative to the central axis 11 to control the angle of attack of the vanes 42, but it may be preferable that the unison member 44 has no other degrees of freedom.

Figure 6:
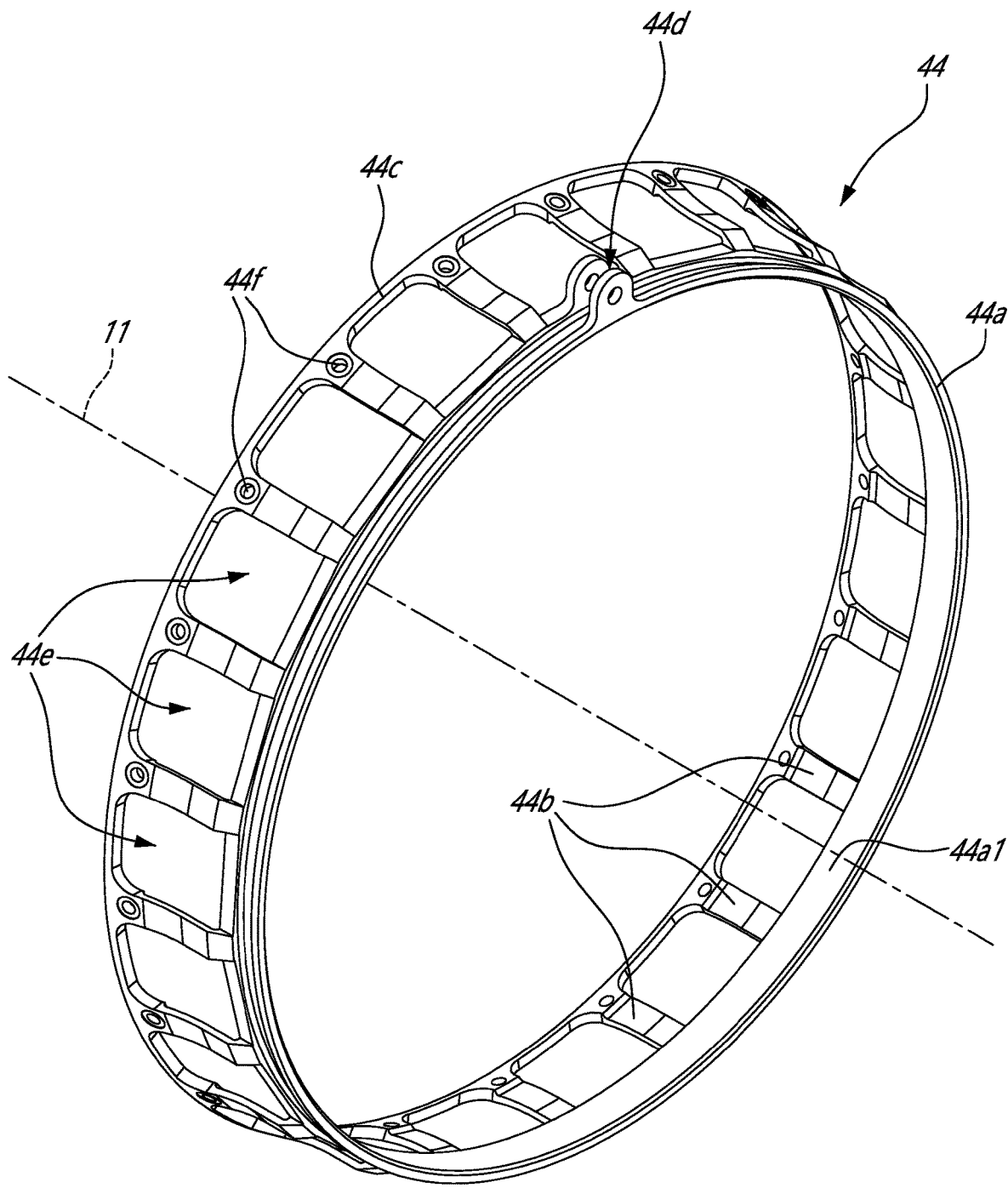
FIG. 6 is a three dimensional view of the unison member of FIG. 4 for the variable guide vane assembly of FIG. 3.

Referring now to FIG. 6, the unison member 44 is shown enlarged. The unison member 44 is subjected to forces imparted to the air flowing around the variable guide vanes 42 and transmitted to the unison member 44 via the vane arms 52. Therefore, the unison member 44 is designed to be able to maintain its shape to be able to maintain the angle of attack defined between the variable guide vanes 42 and the air flowing around them. Hence, stiffness may be a principal design requirement for the unison member 44. Many components in the VGV assembly 40 move during operation. The unison member 44 may have contort around the operation envelope of each of these parts to minimize interference during rotation.

In the embodiment shown, the unison member 44 includes a single monolithic body that extends annularly all around the central axis 11. In one or more embodiments, the unison member 44 has a first ring 44a that is rollingly engaged to the bushing 46, connecting members 44b that extend from the first ring 44a in a direction having an axial component relative to the central axis 11, and a second ring 44c that extends circumferentially all around the central axis 11. The connecting members 44b may alternatively be referred to as stiffeners or beams. Hence, in the depicted embodiment, the first and second rings 44a, 44c of the unison member 44 are connected to one another via the plurality of connecting members 44b that are circumferentially interspaced around the central axis 11. In the embodiment shown, the first ring 44a, the second ring 44c, and the connecting members 44b are all part of a monolithic body. It will however be understood that, in an alternate embodiment, the unison member 44 may be made of a plurality of separate sections secured to one another. The first ring 44a defines a bushing-engaging face 44a1 that is engaged to the bushing 46. The bushing-engaging face 44a1 is, in the embodiment shown, oriented radially inward relative to the central axis 11. Other configurations are however contemplated.

The unison member 44 defines a plurality of pockets 44e circumferentially distributed about the central axis 11. In the embodiment shown, the pockets 44e are free of material to minimize a weight of the unison member 44. Alternatively, the pockets 44e may define a portion of the unison member 44 at which a thickness of material is less than that at the connecting members 44b. Each of the pockets 44e is defined between two circumferentially adjacent ones of the connecting members 44b and between the first and second rings 44a, 44c. As illustrated in FIG. 6, the pockets have a rectangular outline, but other shapes are contemplated as discussed below. The connecting members 44b remain to provide stiffness to the unison member 44.

The unison member 44 defines a plurality of apertures 44f that are circumferentially distributed about the central axis 11. The apertures 44f are located at intersections between the connecting members 44b and the second ring 44c. The apertures 44f are sized to receive the pins 50 that are engaged within slots of the vane arms 52. Having the pins 50 secured to the unison member 44 at intersections between the connecting members 44b and the second ring 44c may minimize deflection of the pins 50 when the unison member 44 is rotated to change the angle of attacks of the vanes 42.

In the embodiment shown, the connecting members 44b are parallel to one another and may be parallel to the central axis 11. They may be non-parallel relative to the central axis 11. The connecting members 44b act as stiffeners to increase a stiffness of the unison member 44. The connecting members 44b extend in a direction that is substantially axial relative to the central axis 11 and allows the first ring 44a to be axially offset from the second ring 44c. Stated differently, in the embodiment shown, an axial distance from the first ring 44a to the second ring 44c relative to the central axis 11 is more than a radial distance from the first ring 44a to the second ring 44c. This axial offset between the two rings 44a, 44c may allow to save radial space in the engine 10.

More specifically, as shown in FIG. 5, this two axially-offset ring configuration of the unison member 44 may allow to have one ring for radially supporting the unison member 44 on the outer casing 26 and a second ring to engage the vane arms 52. If a single ring configuration were used, a radial stack-up would include the outer casing 26, the bushings 46, and the pins 50. A single ring configuration would require more radial space than the two-ring configuration disclosed in the present disclosure. As more radial space is required, overall radial dimensions of the engine 10 may have to be increased. The greater the radial dimension, the heavier and less aerodynamically efficient may become the engine 10. Hence, the disclosed unison member 44 having two rings 44a, 44c offset from one another in an axial direction relative to the central axis 11 may help in maintaining overall radial dimensions of the engine 10 as small as possible.

In the depicted embodiment, a thickness of the connecting members 44b taken in a radial direction relative to the central axis 11 is less than that of the first and second rings 44a, 44c. A width of the connecting members 44b taken in a circumferential direction relative to the central axis 11 is more than a depth of the second ring 44c taken in an axial direction relative to the central axis 11 and less than a depth of the first ring 44a taken in the axial direction. Dimensions of the unison member 44 and of its components, that are, the first and second rings 44a, 44c, the connecting members 44b, and the pockets 44e, are selected in function of dimensions of the engine 10, required stiffness, and so on. In the present case, the unison member 44 includes 20 connecting members 44b, but more or less connecting members 44b may be used. The connecting members 44b may be made thicker and/or wider in order to reduce their numbers. Dynamics analysis may be used to select dimensions of the parts of the unison member 44.

Referring to FIGS. 4 and 6, the unison member 44 defines attachment flanges 44d that are used to secure a movable member 48a of an actuator 48 (FIG. 4). Although two flanges 44d are used in the embodiment shown for receiving therebetween an end of the movable member 48a of the actuator 48, only one flange 44d may be used. The actuators 48 may be secured to the outer casing 26 and operable to move the movable member 48a along its longitudinal axis. In so doing, the unison member 44 rotates around the central axis 11 along direction D1 or D2 depending if the movable member 48a is extended or retraced from a body 48b of the actuator 48.

Referring now to FIG. 7, a unison member in accordance with another embodiment is shown at 144. For the sake of conciseness, only elements that differ from the unison member 44 described herein above with reference to FIG. 6 are described below.

The unison member 144 has a plurality of connecting members 144b connecting the first ring 44a to the second ring 44c. The connecting members 144b includes a plurality of pairs 144b1 of the connecting members 144b. For each of the pairs 144b1 of the connecting members 144b, a first connecting member 144b of the pair 144b1 extends from the second ring 44c toward the first ring 44a and a second connecting member 144b of the pair 144b1 extends from the second ring 44c toward the first ring 44a; the first connecting member 144 of the pair 144b1 extends toward the second connecting member 144 from the first ring 44a toward the second ring 44c. Therefore, in the embodiment shown, the pockets 144e that are defined between the connecting members 144b and the rings 44a, 44c have a triangular outline or shape.

In the embodiment shown, the first and second connecting members 144b of the pair 144b1 merge together at a location distanced from the first ring 44a. A rib 144b2 connects the two connecting members 144b of the pair 144b1 to the first ring 44a. Each pairs 144b1 of the connecting members 144b may be Y-shaped or V-shaped. Other configurations are contemplated. For instance, the connecting members 144b may intersect one another between the two rings to define X-shapes. Any suitable lattice structure for the connecting members is contemplated.

In a particular embodiment, having the unison member 44 having two sections and connecting arms creates a stiffer structure and allows for enhanced rigidity. In a particular embodiment, the unison member may include a truss shape or a grid pattern. Moreover, the two sections with arms allow to remove more material and, thus, reduce the weight. Each of the sliders 50 extends from the unison member 44 along a direction having a radial component relative to the central axis 11.

This disclosed unison members 44, 144 may be made by removing material to form pockets and leaving material to form stiffeners to keep stiffness in a VGV unison member while maintaining the weight saving opportunities that certain manufacturing methods offer. The proposed design for the unison member may utilize a solid body with axisymmetric pockets to reduce the weight of the part. The result may be a stiff ring thanks to the stiffeners and a light ring thanks to the material removal at the pockets. The unison member may be made from a forging, casting or compression molded part with the pockets then machined or manufactured using additive methods. Depending on the stiffness requirements of the unison member, the pockets can be made to have truss shaped stiffeners.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A variable guide vane (VGV) assembly for a gas turbine engine, comprising:
variable guide vanes circumferentially distributed about a central axis, the variable guide vanes rotatable about respective spanwise axes; and
a bushing extending around the central axis; and
a unison member rollingly engageable to a casing of the gas turbine engine for rotation about the central axis, the bushing radially supported by the casing, the unison member operatively connected to the variable guide vanes for rotating the variable guide vanes about the respective spanwise axes, the unison member having:
a first ring extending around the central axis, the first ring rollingly engaged to and radially supported by the bushing, the bushing located radially inwardly of the first ring relative to the central axis,
a second ring spaced apart from the first ring and extending around the central axis, the second ring engaged to the variable guide vanes, and
connecting members rigidly connecting the first ring to the second ring, the connecting members being non-rotatable relative to the first ring and the second ring, the second ring cantilevered from the connecting members, the second ring radially supported solely via the connecting members and the first ring.

2. The VGV assembly of claim 1, wherein the first ring, the second ring, and the connecting members are parts of a single monolithic body of the unison member.

3. The VGV assembly of claim 1, wherein the unison member defines pockets circumferentially interspaced with the connecting members.

4. The VGV assembly of claim 3, wherein the unison member is free of material at the pockets.

5. The VGV assembly of claim 1, wherein the first ring is axially offset from the second ring relative to the central axis.

6. The VGV assembly of claim 1, wherein the connecting members are parallel to one another.

7. The VGV assembly of claim 1, wherein the connecting members includes pairs of connecting members, for a pair of the pairs of the connecting members, a first stiffener of the pair extending from the first ring toward the second ring, a second stiffener of the pair extending from the first ring toward the second ring, the first stiffener extending toward the second stiffener from the first ring toward the second ring.

8. The VGV assembly of claim 1, wherein a thickness of the connecting members taken in a radial direction relative to the central axis is less than a thickness taken in the radial direction for each of the first and second rings.

9. The VGV assembly of claim 1, wherein an axial distance from the first ring to the second ring relative to the central axis is more than a radial distance from the first ring to the second ring.

10. A gas turbine engine, comprising:
an annular gaspath extending around a central axis, the annular gaspath defined between a first casing and a second casing; and a variable guide vane (VGV) assembly having variable guide vanes circumferentially distributed about the central axis, the variable guide vanes rotatable about respective spanwise axes, and a unison member rollingly engaged to the first casing and rotatable about the central axis, the unison member operatively connected to the variable guide vanes for rotating the variable guide vanes about the respective spanwise axes, the unison member defining a plurality of pockets circumferentially distributed about the central axis, the pockets located between a first ring and a second ring of the unison member, the first ring and the second ring being part of a monolithic body of the unison member.

11. The gas turbine engine of claim 10, wherein the unison member is free of material at the pockets.

12. The gas turbine engine of claim 11, wherein the pockets are rectangular.

13. The gas turbine engine of claim 11, wherein the pockets are triangular.

14. The gas turbine engine of claim 11, wherein the first ring is axially offset from the second ring relative to the central axis.

15. The gas turbine engine of claim 14, wherein the second ring defines apertures circumferentially distributed about the central axis, the apertures receiving pins, the unison member operatively connected to the variable guide vanes via the pins slidably received within slots of vane arms secured to the variable guide vanes.

16. The gas turbine engine of claim 15, wherein each of the apertures is located at an intersection of the second ring and a respective one of connecting members, the connecting members connecting the first ring to the second ring and interspaced with the pockets.

17. The gas turbine engine of claim 16, wherein the first ring is received within a groove defined by a bushing supported by the first casing, the first ring rollingly engaging the first casing via the bushing.

18. The gas turbine engine of claim 17, wherein an axial distance from the first ring to the second ring relative to the central axis is more than a radial distance from the first ring to the second ring.

19. The gas turbine engine of claim 18, wherein the unison member defines an attachment point for an actuator, the attachment point protruding from the first ring.

* * * * *